US006183097B1

United States Patent
Saif et al.

(10) Patent No.: US 6,183,097 B1
(45) Date of Patent: Feb. 6, 2001

(54) MOTION AMPLIFICATION BASED SENSORS

(75) Inventors: Mohammed T. A. Saif; Noel C. MacDonald, both of Ithaca, NY (US)

(73) Assignee: Cornell Research Foundation Inc., Ithaca, NY (US)

(*) Notice: Under 35 U.S.C. 154(b), the term of this patent shall be extended for 0 days.

(21) Appl. No.: 09/348,321

(22) Filed: Jul. 8, 1999

Related U.S. Application Data

(60) Provisional application No. 60/115,634, filed on Jan. 12, 1999.

(51) Int. Cl.$^7$ .................................................. G02B 7/182
(52) U.S. Cl. ..................... 359/871; 359/872; 359/874; 359/223; 359/225; 359/226; 359/291
(58) Field of Search ................................... 359/871, 872, 359/874, 223, 224, 225, 226, 291, 292, 847, 846, 849, 855

(56) References Cited

U.S. PATENT DOCUMENTS

| | | | |
|---|---|---|---|
| 1,910,119 | 5/1933 | Moats | 359/847 |
| 4,622,514 | 11/1986 | Lewis | 324/158 |
| 4,919,500 | 4/1990 | Paulsen | 359/214 |
| 5,005,298 | 4/1991 | Nagasawa et al. | 33/573 |
| 5,191,252 | 3/1993 | Sano | 310/323 |
| 5,235,187 | 8/1993 | Arney et al. | 250/306 |
| 5,355,712 | 10/1994 | Petersen et al. | 73/1.38 |
| 5,415,043 | 5/1995 | Zabler et al. | 73/517 |
| 5,447,067 | 9/1995 | Biebl et al. | 73/514.32 |
| 5,479,042 | 12/1995 | James et al. | 257/415 |
| 5,513,031 | * 4/1996 | Vuilleumier et al. | 359/227 |
| 5,559,358 | 9/1996 | Burns et al. | 257/431 |
| 5,589,974 | * 12/1996 | Goossen et al. | 359/290 |

OTHER PUBLICATIONS

M.T.A. Saif et al, "A millinewton microloading device", Sensors and Actuators A 52 (1996), pp. 65–75.

Stephen P. Timoshenko et al, "Theory of Elastic Stability", Eng. Societies Monographs, 1961, pp. 46–83.

Haengsoo Lee et al, "Finite Element Analysis of Lateral Buckling for Beam Structures", Computers & Structures, 1994, vol. 53, No. 6, pp. 1357–1371.

M. Savoia et al, "Post–buckling Behavior of Stiffened Cross–Ply Cylindrical Shells", Transactions of the ASME, Dec. 1994, vol. 61, pp. 998–1000.

Reid A. Brennen et al, "Large Displacement Linear Actuator", IEEE, CH2783–9/90, 1990, pp. 135–139.

(List continued on next page.)

Primary Examiner—Mohammad Y. Sikder
(74) Attorney, Agent, or Firm—Jones, Tullar & Cooper, P.C.

(57) ABSTRACT

A micromechanical micromotion amplifier has an integrated structure formed primarily of silicon and comprises a plurality of long slender flexible beams which are connected in a predetermined manner. The beams are released from a silicon substrate for movement with respect to fixed points of reference upon the substrate. Each beam thereby has a fixed end and a relatively moveable free end. Compressive axial force induced by axial movement, applied to the moveable end of a beam, will cause that beam to deform or buckle. Buckling occurs transversely in-plane due to a high aspect ratio profile of each beam. The amount of lateral or transverse movement of a beam due to buckling is relatively large in relation to the applied axial force or axial movement which causes it. By arranging these beams in cooperating perpendicular pairs as micromotion amplifier stages, an input axial force/movement applied to the moveable free end of a first beam generates a transverse motion or buckling movement of that beam.

15 Claims, 4 Drawing Sheets

OTHER PUBLICATIONS

Ulf Lindbergt et al, "Quasi–buckling of micromachined beams", J. Micromech. Microeng. 3, 1993, pp. 183–186.

M.T.A. Saif et al, "Micromotion–Amplifier", School of Electrical Engineering and The National Nanofabrication Facility, Nov. 1995, pp. 1–6.

X.T. Huang et al, "A Micromotion Amplifier", School of Electrical Engineering and the Cornell Nanofabrication Facility, 1996, pp. 424–428.

Microinstruments for submicron material studies, J. Mater. Res., vol. 13, No. 12, Dec. 1998, Materials Research Society, pp. 3353–3356.

Measurement of forces and spring constants of microinstruments, Review of Scientific Instruments, vol. 69, No. 3, American Institute of Physics, pp. 1410–1422.

* cited by examiner

MOTION AMPLIFICATION BASED SENSORS

CROSS REFERENCE TO RELATED APPLICATION

This application claims the benefit of U.S. Provisional Application Ser. No. 60/115,634 filed on Jan. 12, 1999, the disclosure of which is hereby incorporated herein by reference.

This invention relates to U.S. Pat. No. 5,862,003, entitled MICROMOTION AMPLIFIER, the disclosure of which is also hereby incorporated herein by reference.

The invention was made with Government support under Grant No. DABT 63-95-C-0121, awarded by the Defense Advanced Research Project Agency (DARPA). The Government has certain rights in the invention.

BACKGROUND OF THE INVENTION

The present invention relates in general to micromechanical motion amplifiers and more particularly, to integrated micromechanical structures wherein a small amount of driving force or motion translates through the device to produce a relatively large motion in a direction transverse to the driving motion. In such devices, relatively thin, elongate beams are designed to buckle in response to an applied axial compressive force induced by axial motion. The motion produced by the deformation or buckling is an order of magnitude greater than the applied axial motion which causes it. Thus, micromotion amplifiers may be provided.

Such prior art devices exhibit a limited amount of output and are thereby constrained with respect to a maximum amount of sensitivity with which they may operate. It follows that such devices are necessarily greatly limited in their application as sensors. Accordingly, there has been a long felt need for integrated micromotion amplification apparatus in which the amount of output deflection and hence sensitivity, is not limited or constrained by a single beam. In accordance with the present invention, the need for increased sensitivity in a micromotion device, is fulfilled by a micromotion amplifier wherein the ultimate output deflection or buckling, and hence overall sensitivity, is predetermined by the additive effect of assembling buckling beams in cooperating pairs or stages.

SUMMARY OF THE INVENTION

It is an object of the present invention to provide a buckling beam micromotion amplifier in which the ultimate output deflection, and hence sensitivity, is not constrained by the deflection of a single beam.

It is also an object of the present invention to provide a micromotion amplifier in which the sensitivity to an applied axial force is greatly increased over that of the prior art.

It is also an object of the present invention to provide micromotion amplifier stages, in the form of cooperating pairs of buckling beams, which may be cascaded.

It is also an object of the present invention to provide a method and apparatus by which minute amounts of movement may produce greatly increased motion within an integrated device, in orders of magnitude heretofore previously unattained, to form the basis of highly sensitive motion amplification sensors, switches and the like. Other features and advantages will be made apparent from the following description.

In accordance with the present invention, a method and apparatus are provided for amplifying micromechanical or microelectromechanical motion in orders of magnitude unattainable by prior micron-scale mechanical devices. Integrated buckling beams are released from a single crystal silicon substrate in cooperating pairs or stages. Each buckling beam is formed having an asymmetrical cross-section (high aspect ratio), i.e., the height of each beam is much greater than its' width. This asymmetry will effectively bias or predispose each beam to bend or buckle in a predetermined direction when an applied axial force exceeds a critical value. The initial input axial force applied to a first beam can be provided by any desired source. Axial forces acting upon any subsequent beam in a pair or series of beam pairs are provided by the previous beam buckling in response to a lesser axial force. In other words, the beams are arranged in such a manner as to induce a chain reaction of buckling in one or more subsequent beams in response to an input axial force applied to the first beam. Since the amount of transverse deformation of any one beam is greater than the amount of axial motion necessary to cause it, the net deformation or buckling from a final beam in a cascade array of beam pairs or stages is significantly greater in magnitude than the initial input movement applied. Amplification of micromotion may thereby be provided as a function of a number of micromotion amplifier stages and these stages may be cascaded as desired.

In a preferred form of the present invention, a first micromechanical beam has a free first end and a second end fixed to a reference point on the substrate. A second micromechanical beam has a first end connected to a middle or buckling region of the first beam and a second end fixed to another reference point on the substrate. The first and second beams are arranged to be substantially coplanar and perpendicular to each other. The first end of the first beam may be acted upon by an actuator to induce an input axial force or movement upon the first beam and thereby produce an output buckling of the first beam. The output buckling of the first beam provides an input axial force or movement upon the second beam, thereby producing an output buckling of the second beam. Accordingly, the first and second beams arranged to function in this manner comprise a micromotion amplifier stage and any number of such stages may be cascaded.

Suitable actuators for inducing an input axial force may comprise devices having physical properties which are responsive to temperature, pressure, humidity, impact, acceleration or other parameters. Suitable actuators may also comprise active devices such as capacitive comb-drive actuators. Preferably, one or more integrated tunneling tips are provided for detecting, measuring and indicating an amount of buckling produced by any or all beams in a stage or cascade array. In addition, integrated capacitive or resistive sensors or other non-integrated external devices such as atomic force microscopes may be used for detecting the motion of the beams. The preferred form may further include adjunct beams provided at one or more beam ends in one or more stages, for the purpose of prestressing a beam and thereby reducing the amount of axial force necessary to induce buckling. Sensitivity of the device in any one or more stages is thereby greatly enhanced.

An alternate embodiment of the present invention provides micromotion amplifier stages each comprising a first beam having first and second ends fixed to reference points on the substrate; a second beam having a first end connected to the first beam with a second end fixed to another reference point on the substrate; and an actuator. The exact point along the first beam where the first end of the second beam is connected, is chosen so as to influence the direction in which the second beam will buckle. The actuator is provided at this point of connection, acting transverse to the first beam and coaxial to the second beam, so as to induce a buckling force in the second beam in the predetermined direction. In this embodiment, the beams may be made electrically conductive. Two of such stages, electrically isolated, may be disposed in parallel opposing relationship such that one or both of the second beams of each stage will buckle into or out of contact with one another, in response to energization of one or both of the actuators. Beam stages arranged according to this alternate embodiment may thereby function as a micromechanical switch. Such switches may be made highly sensitive by prestressing the first beam in each stage. Sensitivity may be enhanced even further by the addition of one or more micromotion amplifier stages of the preferred embodiment for amplifying buckling forces transmitted by one or more of the actuators.

BRIEF DESCRIPTION OF THE DRAWINGS

The foregoing and additional objects, features and advantages of the present invention will become apparent from the following detailed description of the preferred embodiments, taken in conjunction with the accompanying drawings in which.

DESCRIPTION OF THE PREFERRED EMBODIMENTS

Figure 1:
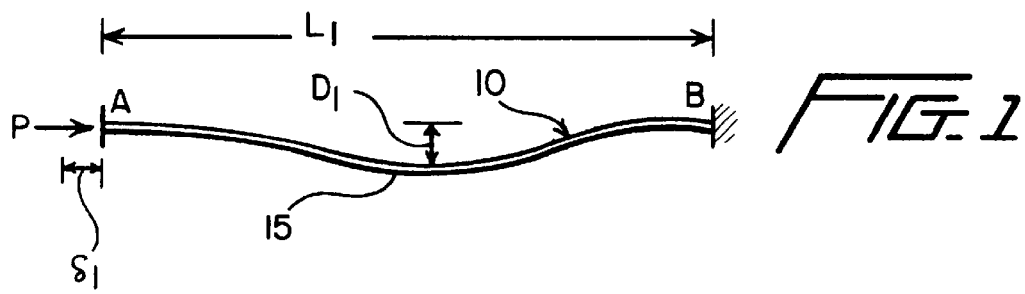
FIG. 1 illustrates in diagrammatic form the transverse buckling response of a long slender beam due to a compressive axial force.

Referring to FIG. 1, a long slender beam 10 has a movable first end A, a fixed second end B, a middle region 15 and a length $L_1$. When the beam 10 is compressed axially along its length $L_1$ by a force P applied to the first end A which exceeds a critical value, the first end A displaces axially by an amount $\delta_1$ causing the beam 10 to buckle and deform transversely within a plane. The planar or transverse deformation of the beam 10 upon buckling, results in a relative displacement of the middle region 15 by a distance D1 which is usually much larger than the relative axial displacement $\delta_1$ of the first end A. For a beam AB fixed at one end;

$$D1 = 2/\pi\sqrt{L_1 \delta_1} \qquad \text{(Eq. 1)}$$

For example, if the length of the beam $L_1 = 1000$ μm and the axial displacement $\delta_1 = 0.1$ μm, then the buckling displacement $D_1 = 6.37$ μm. The motion is therefore amplified by a factor of 60.

Figure 2:
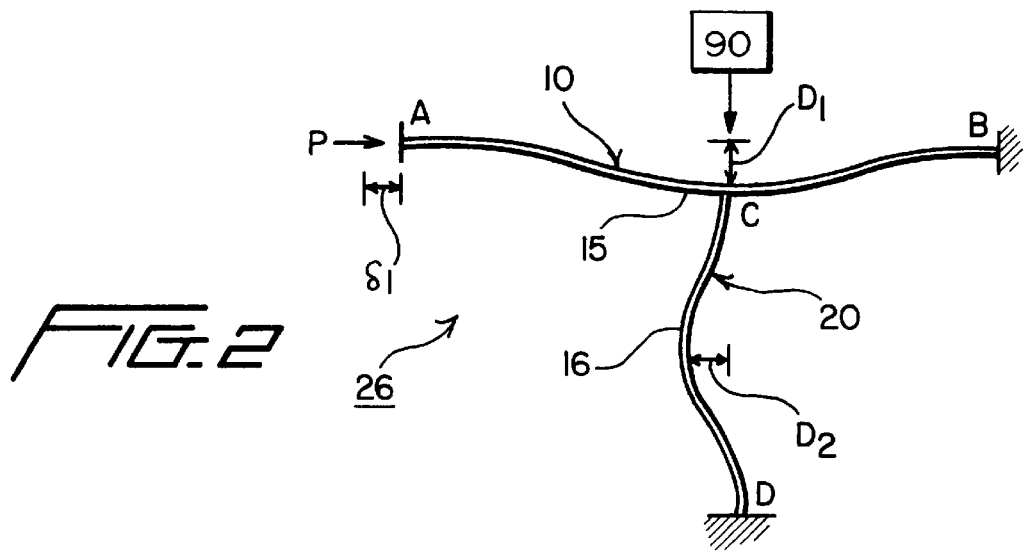
FIG. 2 illustrates in diagrammatic form the interaction of two beams which comprise a micromotion amplifier stage according to the present invention.

Referring to FIG. 2, if another beam 20 has a fixed end D, a middle region 16 and a moveable end C attached to the middle region 15 of beam 10 in the manner shown, then the displacement $D_1$ of beam 10 will induce axial end displacement upon beam end C of beam 20. This will cause transverse deformation or buckling in the middle region 16 of beam 20 over a distance $D_2$. The amplified motion or net output displacement $D_2$ of beam 20 for a given initial input displacement $\delta_1$ of beam 10 is $$D_2 = 2/\pi\sqrt{L_2 D_1} = 2/\pi\sqrt{L_2 \frac{2}{\pi}\sqrt{L_1 \delta_1}} \qquad \text{(Eq. 2)}$$

Figure 3:
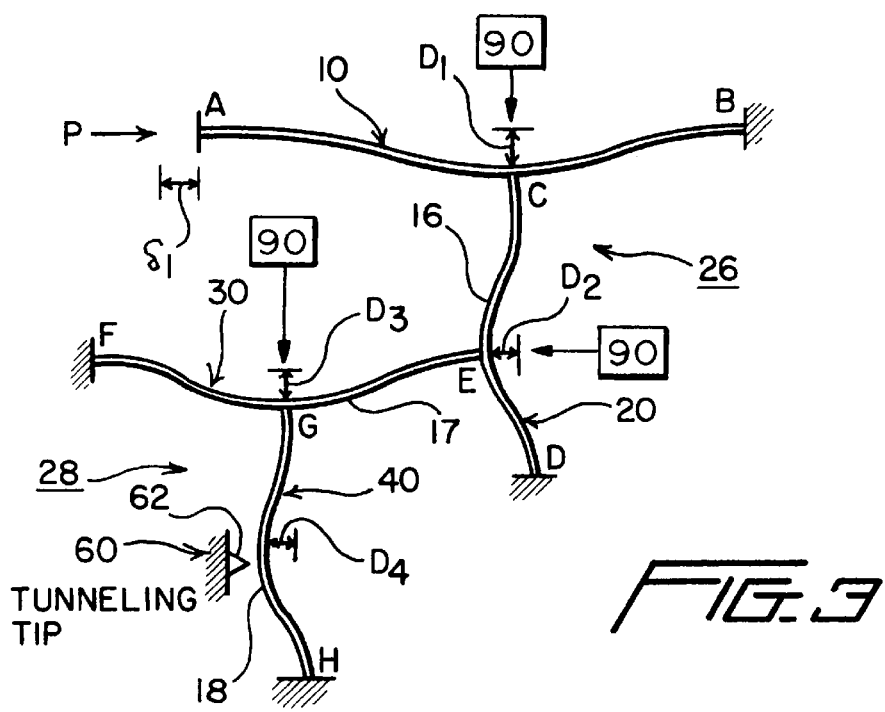
FIG. 3 illustrates in diagrammatic form two cascaded micromotion amplifier stages.

The connection of beam 10 and beam 20 may be referred to herein as a micromotion amplifier stage, generally indicated at 26. As illustrated in FIG. 3, a second micromotion amplifier stage 28, comprising a third beam 30 and a fourth beam 40, may be connected to amplifier stage 26 to provide a cascaded micromotion amplifier. In the illustrated embodiment, the third beam 30 has a moveable end E, a fixed end F and a middle region 17 displaceable over a distance $D_3$. The moveable end E is connected to the middle region 16 of beam 20. The fourth beam 40 has a moveable end G, a fixed end H and a middle region 18 displaceable over a distance $D_4$. The moveable end G is connected to the middle region 17 of beam 30. Similar to that explained above with respect to beam 20, the third beam 30 is driven axially by the buckling displacement $D_2$ of beam 20, causing beam 30 to buckle in its middle region 17 over the distance $D_3$. The fourth beam 40 is in turn driven axially by the buckling displacement $D_3$ of beam 30, causing beam 40 to buckle in its middle region 18 over the distance $D_4$. A tunneling tip 60 is fixed in proximity to a maximum deflection point of region 18 of beam 40 for the purpose of measuring and indicating the buckling displacement distance $D_4$. For the two stage cascaded amplifier illustrated in FIG. 3, an input force P applied to end A of beam 10 will axially displace end A by the amount $\delta_1$ which will thereby induce a chain reaction of buckling through beams 10, 20, 30 and 40 and produce a measurable net output displacement $D_4$. It is important to note that this net output displacement $D_4$ of beam 40 is significantly greater in magnitude than the initial input axial displacement $\delta_1$ applied to beam 10. Displacement outputs of greater magnitude can be obtained by cascading additional micromotion amplifier stages.

In general for a given number of n beams;

$$D_n = \left(\frac{2}{\pi}\right)^{1+1/2+1/2^2+\ldots+1/2^{n-1}} L_1^{1/2^n} L_2^{1/2^{n-1}} \ldots L_n^{1/2} \delta_1^{1/2^n} \quad \text{(Eq. 3)}$$

If L1=L2=L3= . . . $L_n$=L, then $$D_n = \left(\frac{2}{\pi}\right)^{1+1/2+1/2^2+\ldots+1/2^{n-1}} L^{1/2+1/2^2+\ldots+1/2^n} \delta_1^{1/2^n} \quad \text{(Eq. 4)}$$

Referring again to FIG. 3 for example, when four beams 10, 20, 30 and 40 each 1000 $\mu$m in length, are connected as illustrated, and beam 10 is subjected to an axial end displacement of 1 Angstrom ($10^{-4}$ $\mu$m), then n=4, L=1000 $\mu$m, $\delta_1=10^{-4}$ $\mu$m, then $D_4$=156.66 $\mu$m and the net motion amplification is $D_4/\delta_1$=156.66×$10^4$.

For n beams arranged in this manner, the relative change in transverse deformation $D_n$ (of the last beam) due to buckling, as induced by a small change in $\delta_1$, is given by the derivative:

$$\frac{dD_n}{d\delta_1} = \left(\frac{2}{\pi}\right)^{1+1/2+1/2^2+\ldots+1/2^{n-1}} L^{1/2+1/2^2+\ldots+1/2^n} (1/2)^n 1/\delta_1^{1-1/2^n} \quad \text{(Eq. 5)}$$

$$= \frac{1}{2^n} \frac{D_n}{\delta_1}$$

Again with n=4, $\delta_1=10^{-4}$ $\mu$m, $D_4$=156.66 $\mu$m;

$dDn/d\delta_1 = 9.79 \times 10^4$.

i.e., if $\delta_1$ increases by 0.0001 Angstrom ($10^{-8}$ $\mu$m), then $D_4$ will increase by approximately 0.001 $\mu$m or 1 nm, thereby providing nanometer scale measurements of motion.

In the preferred form of the present invention, thin elongate high aspect ratio flexible beams, suitable for use as micromotion amplifiers and sensors, are fabricated as coplanar cooperating pairs or stages within a single crystal silicon substrate using the SCREAM (Single Crystal Reactive Etching and Metallization) process disclosed in U.S. Pat. No. 5,198,390, U.S. Pat. No. 5,316,979, both to MacDonald et al. and in U.S. Pat. No. 5,719,073 to Shaw et al., the disclosures of which are incorporated herein by reference. Although the SCREAM process is preferred, other processes such as the polysilicon process could be used as well. Devices fabricated in accordance with the SCREAM process may also be referred to as MEMS devices.

Figure 4:
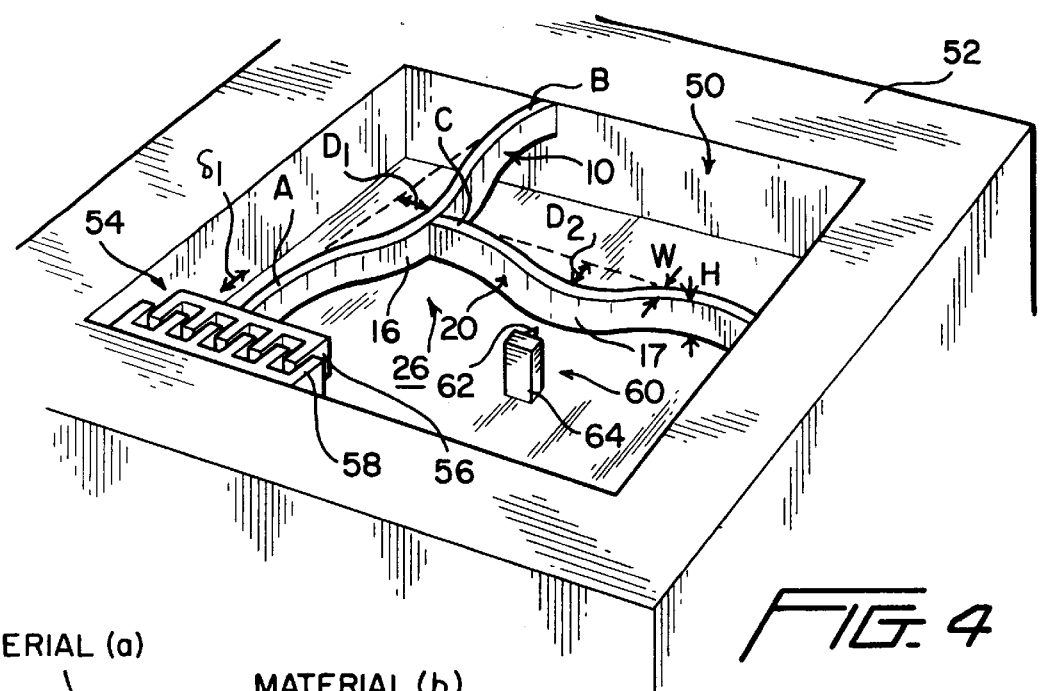
FIG. 4 illustrates a three dimensional perspective view of the micromotion amplifier stage of FIG. 2, fabricated from a single crystal silicon substrate.

Etched and released beams are formed in coplanar cooperating pairs connected in the manner illustrated diagrammatically in FIGS. 2 and 3 and in a perspective view in FIG. 4. Cooperating beam pairs connected as illustrated diagrammatically in FIG. 2, comprise a micromotion amplifier stage 26 and additional stages may be cascaded, as illustrated in FIG. 3, to achieve the amount of desired amplification and corresponding sensitivity. In the preferred form of the invention, the beams are constructed to have high aspect ratio profiles to control their direction of buckling. Thus for example, each beam may be 12 micrometers deep, 1 to 2 micrometers wide and 3 to 5 millimeters or more in length. As illustrated in FIG. 4, the beams may be released, moveable structures fabricated within a cavity 50 of a substrate 52, preferably of single crystal silicon. One or more beam ends are unitary with a wall of the cavity 50 in which the beams are located to provide fixed reference points. In a similar manner, one or more beam ends such as beam end A in FIG. 4, may incorporate an element which is part of an actuator 54 fabricated simultaneously with beam fabrication. Such an element could be the moveable fingers 56 of a MEMS capacitive comb-drive actuator which interact with stationary fingers 58 on the substrate wall. Application of a voltage across the fingers 56 and 58 imparts an axial compressive force P or motion $\delta_1$ to the beam end A. Other actuator elements, including those which exhibit physical properties responsive to temperature, pressure, humidity, impact or acceleration, for example, may also be used.

As illustrated in FIG. 3, a suitable detector 60 is provided adjacent the buckling or middle region 18 of the beam 40 where motion is to be detected. The detector 60 measures the deflection $D_4$ of beam 40. As illustrated in FIG. 4, the detector 60 is adjacent the middle region 16 of beam 20 to measure the deflection $D_2$. In a preferred form of the invention, the detector 60 includes one or more tunneling tips 62, emitter tips, or the like, integrally formed upon an upstanding pillar 64 on a floor of the substrate cavity 50 for conducting a current proportional to the amount of buckling movement of the corresponding beam. An example of tunneling tip fabrication is disclosed in U.S. Pat. No. 5,235,187 to Arney et al. Optionally, these tunneling tips may be formed integral to one or more of the beams or sidewalls of the substrate cavity. In either case however, it is preferred to have at least one tunneling tip arranged in proximity to a final or last stage beam as shown in FIG. 3, to facilitate the detection of motion amplification $D_4$ produced by the device. Amplified motion may also be detected by non-integrated devices having a resolution greater than 1 nm. Atomic force microscopes may be used, for example. Thus, by measuring a change of 1 nm in the amplified motion output deflection $D_4$ of a final beam 40 in a cascade series of micromotion amplifier stages 26, 28, it is possible to sense a minute change in motion $\delta_1$ of $10^{-8}$ $\mu$m at the input of beam 10.

Sensors for a wide variety of measurable parameters may be made using the micromotion amplification described above and specific examples of these are described below.

Temperature Sensor

Figure 5:
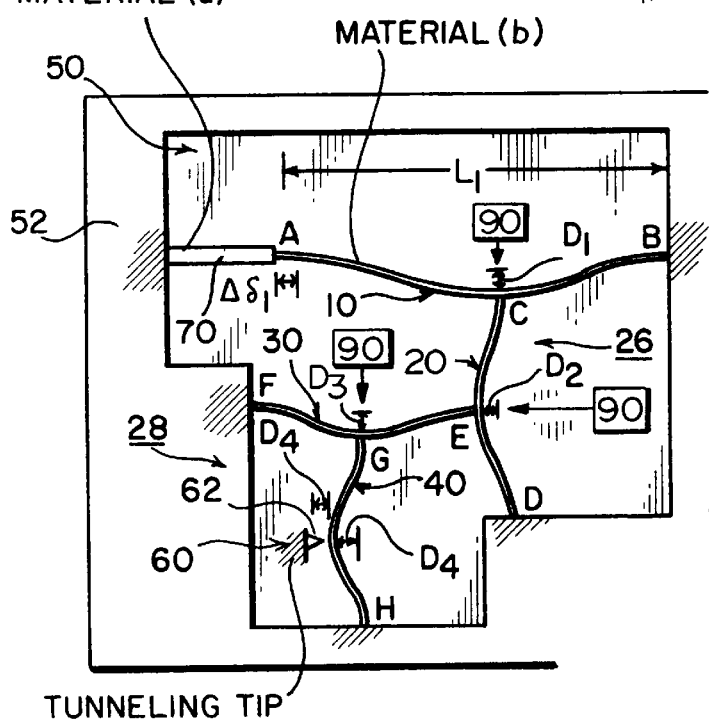
FIG. 5 illustrates in diagrammatic form a two stage cascade micromotion amplifier wherein input axial compressive force is provided to a first beam by a structure which is responsive to ambient conditions or other measurable parameters.

Referring to FIG. 5, the moveable end A of beam 10 may be connected to the substrate 52 by a rigid beam 70 of a material (a) such as silicon dioxide. Four flexible beams 10, 20, 30, and 40 are preferably fabricated of a material (b) which is the same as the substrate; for example, single crystal silicon. The beams are released from the substrate 52 for motion with respect to the substrate 52 and are arranged in two cascaded amplifier stages as described and illustrated previously with respect to FIG. 3. The beam ends B, D, F and H are formed integrally with corresponding points along the substrate cavity walls and comprise fixed references for the relative motion of the beams. If the thermal coefficients of expansion for the material (a) of beam 70 and the material (b) of the beams 10, 20, 30 and 40 are $\alpha_a$ and $\alpha_b$, respectively, and the beams are fabricated at a temperature higher than room temperature such that $\alpha_a$ is greater than $\alpha_b$, then the rigid beam 70 will apply a compressive axial force upon flexible beam 10 as the entire assembly cools and one or more of the beams 10, 20, 30 and 40, depending upon their relative lengths, will buckle. By proper design of the lengths of the beams and if necessary, by the provision of an adjustable mounting for the beam 10 at end B, the beams 10, 20, 30 and 40 will be slightly prestressed such that the beams will buckle with only a very small amplitude of applied force or motion. For example, by careful selection of the length of beam 70 with respect to the length of beam 10, the cooling of the MEMS amplifier stages 26 and 28 will produce a shift in the location of beam end A by a distance on the order of $\delta_1=10^{-4}$ µm. This will buckle beams 10, 20, 30 and 40 to produce a prestressed shift at the output from beam 40 of $dD_4/d\delta_1=156.66\times10^4$.

Figures 6, 7:
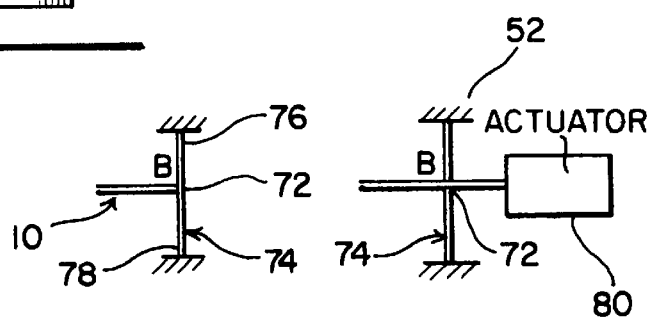
FIG. 6 illustrates in diagrammatic form an adjunct beam for prestressing the first beam of FIG. 5 near the point of buckling.
FIG. 7 illustrates in diagrammatic form an adjunct beam in combination with an actuator for prestressing the first beam of FIG. 5 near the point of buckling and for inducing compressive axial force upon the first beam.

Preferably, the fixed mounting of beam 10 at end B, illustrated in FIG. 5 as being on the wall of cavity 50 in substrate 52, is modified for example as illustrated in FIG. 6 or FIG. 7, to provide an adjustable mounting. Such a mounting provides control of the amount of prestressing in the beam 10 and thus, in beams 20, 30 and 40. As illustrated in FIG. 6, beam end B may be secured to, or integral with, a point 72 on a relatively short flexible support beam 74 perpendicular to beam 10 and fixed at its ends 76, 78 to the substrate 52. If desired, an actuator 80 such as a comb-type capacitive actuator can be secured to, or integral with, support beam 74 at point 72, as illustrated in FIG. 7. The beam 74 in FIG. 6, or optionally, the combination of beam 74 and actuator 80 in FIG. 7, provide a small axial prestress to the amplifiers 26 and 28 to provide in beam 10 a shift on the order of $\delta_1=10^{-4}$ µm as discussed above. Therefore, with the structure of FIG. 5 modified in accordance with FIG. 6 or 7 to prestress the beams 10, 20, 30 and 40 at or near the point of buckling, an ambient temperature change of $\Delta T$ will cause a displacement $\Delta\delta_1$ in the location of end A of beam 10, due to the different temperature coefficients of the materials X and Y of beam 70 and beams 10, 20, 30 and 40.

Since $\Delta\delta_1=L_1(\alpha_b-\alpha_a)\Delta T$ and $\Delta T=\Delta\delta_1/(L_1(\alpha_b-\alpha_a))$, then for beam 10 with a length $L_1=100$ µm and $(\alpha_b-\alpha_a)$ is on the order of $10^{-6}$/C (as is the case for Silicon and Silicon Dioxide), a temperature change of $10^{-4}$ C will produce an axial end shift of beam end A of $\Delta\delta_1=10^{-8}$ µm, resulting in a change at $D_4$ of 1 nm. This can be can be accurately sensed by a tunneling tip, for example, providing a highly sensitive temperature sensor, or thermometer.

Irrespective of the parameter being sensed, the sensitivity of the device can be increased significantly by cascading additional beam stages. The sensitivity may be increased even further by the provision of an additional actuator 90 acting coaxially upon beam end C of beam 120 in the manner shown in FIG. 2 for a one stage micromotion amplifier or upon beam ends C, E and G of beams 20, 30, 40, respectively, in the manner shown in FIGS. 3 and 5 for a two stage micromotion amplifier.

Humidity Sensor

In the device illustrated in FIG. 5, the rigid beam 70 disposed between the substrate 52 and the end A of the beam 10 may be fabricated of a material which will absorb moisture from the ambient atmosphere and swell in proportion to the absorbed moisture along a longitudinal axis thereof. The axial length of the rigid beam 70 will change by $\Delta\delta_1$ and thereby induce a change in the output deformation $D_4$ of beam 40 as described above. This change can be sensed by a detector such as the tunneling tip 62, formed integral to the substrate as shown. Alternately, tunneling tip 62 could be formed integral to beam 40.

Pressure Sensor

Figure 8:
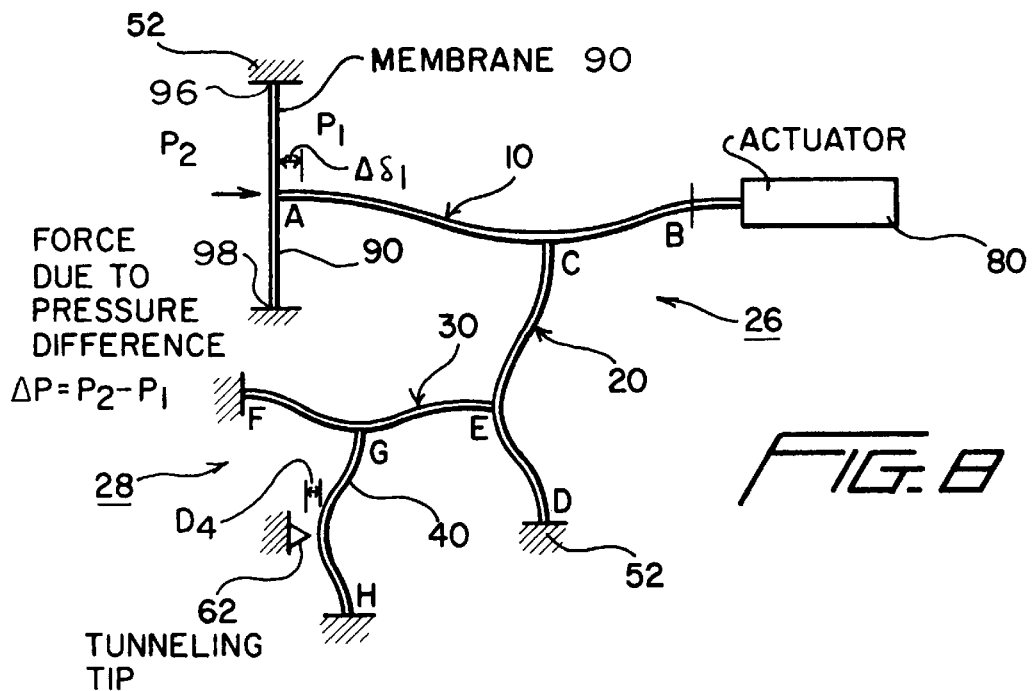
FIG. 8 illustrates in diagrammatic form a two stage cascade micromotion amplifier wherein input compressive axial force is provided by structure which is responsive to pressure.

In the embodiment of FIG. 8, the rigid beam 70 of the device in FIG. 5 is replaced by a flexible membrane 90 which is secured to the substrate 52 at membrane ends 96, 98. The membrane 90 is subject to pressure $p_1, p_2$, with the net force acting upon the membrane being due to a pressure differential $\Delta p$ across the membrane 90, $\Delta p=(p_2-p_1)$. The beams are initially buckled or prestressed by the actuator 80 as described above. If the pressure differential $\Delta p$ changes from an initial value, membrane 90 will shift in one direction or the other, causing an axial displacement $\Delta\delta_1$ in end A of beam 10 and thereby inducing a corresponding change in $D_4$ of beam 40. This change in the final output is sensed by the tunneling tip 62 so that a small change in pressure can be detected. Such devices may also be used as acoustic sensors.

Accelerometer

Figure 9:
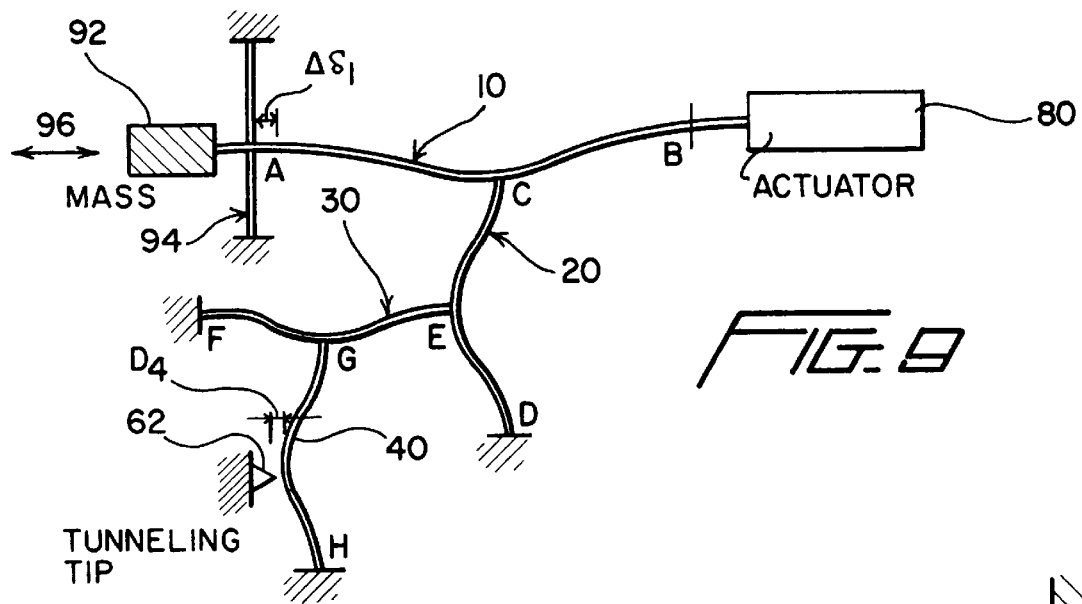
FIG. 9 illustrates in diagrammatic form a two stage cascade micromotion amplifier wherein input compressive axial force is provided by structure which is responsive to inertia.

In the embodiment of FIG. 9, a mass 92 is provided to act upon the axis of beam 10 as shown. A flexible support beam 94 is arranged perpendicular to beam 10 for securing the mass 92 and may be secured to or integrated with the end A of the beam 10. In addition to securing the mass 92, the support beam 94 may also be provided for prestressing the beam 10. Optionally, the membrane 90 illustrated in FIG. 8, may be used instead of support beam 94 to secure the mass 92. The beams 10, 20, 30, and 40 are initially buckled by the actuator 80, as discussed above. If the system experiences an acceleration or deceleration which produces a force parallel to the axis of beam 10, as indicated by arrow 96, the mass 92 will exert a force upon the system due to its inertia. Accordingly, beam end A will move by an amount $\Delta\delta_1$ and consequently a change in $D_4$ of beam 40 will be sensed by the tunneling tip 62. Thus, the above device may be used as a highly sensitive accelerometer.

Micro Switch

Figure 10:
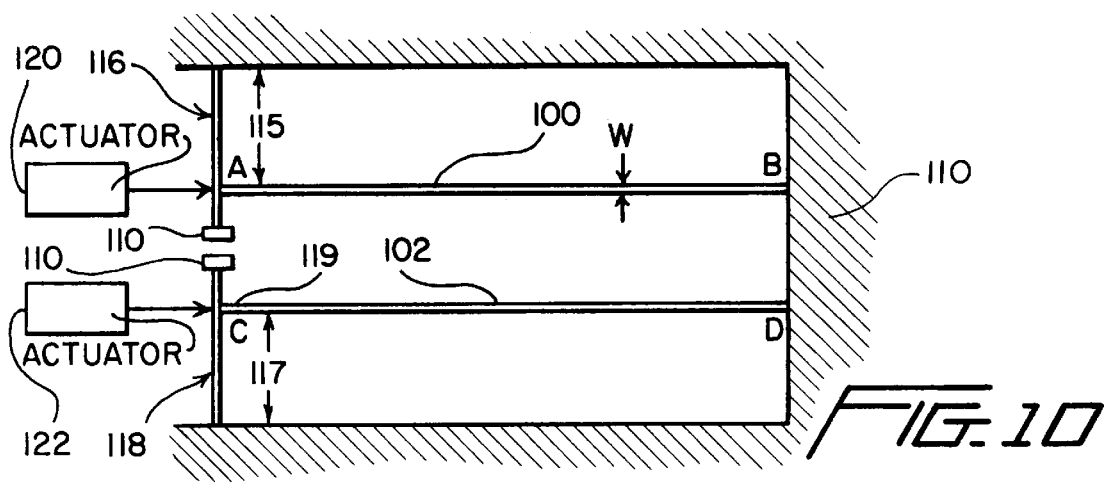
FIG. 10 illustrates in diagrammatic form an alternate embodiment of the present invention comprising a microswitch.
Figure 11:
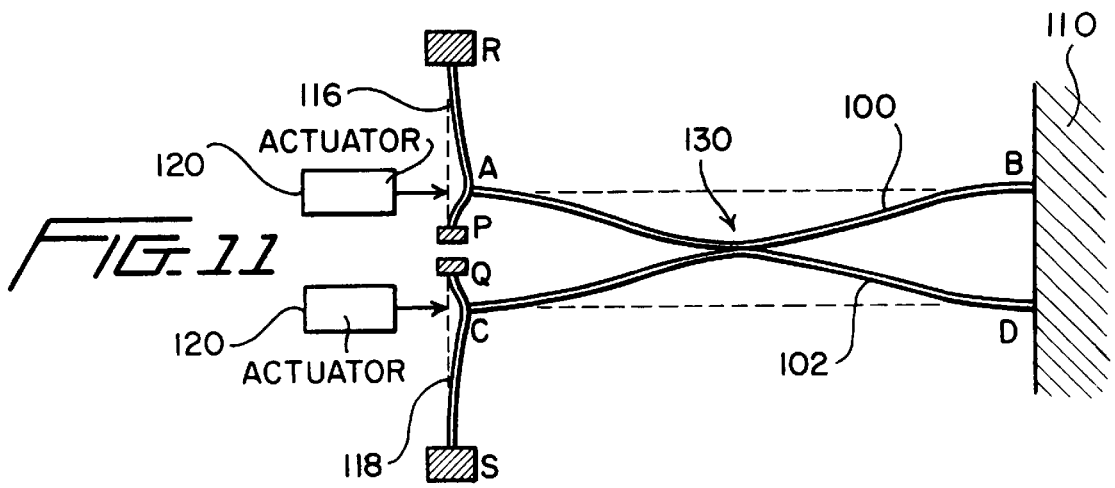
FIG. 11 illustrates in diagrammatic form the alternate embodiment of FIG. 10 when energization of the actuators induces buckling to a point where contact is made between the two buckling beams of the micro-switch.
Figure 13:
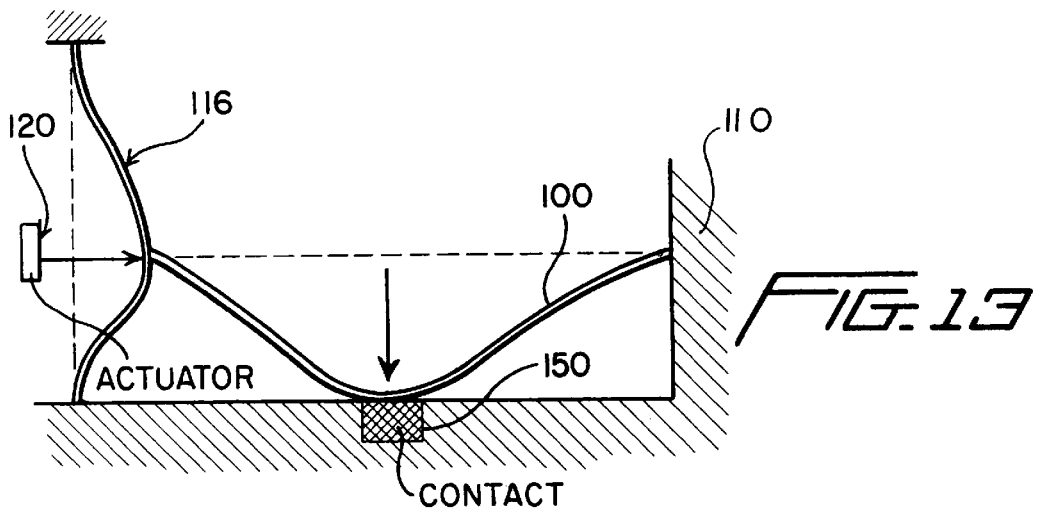
FIG. 13 illustrates in diagrammatic form the alternate embodiment of FIG. 12 when energization of the actuator induces buckling to a point where electrical contact is made.

The embodiment of FIGS. 10 and 11 illustrates the use of the MEMS amplifiers of the present invention as micromotion activated electrical contacts. Such a device is useful as a micro-switch or micro-relay, for example.

In this embodiment, the MEMS micromotion amplifiers consist of parallel first and second high aspect ratio beams 100,102 and corresponding perpendicular support beams 116, 118. The beams 100, 102, 116 and 118 are preferably fabricated of single crystal silicon within a cavity of a substrate 110 using the SCREAM process so that the beams are made integral to the substrate but are released from it and relatively moveable. The beams 100, 102, 116, 118 are coplanar and have high aspect ratio profiles. For example, each of the beams may be 1–2 µm wide, 10–20 µm deep and 3–5 mm in length. The beams 100 and 102 are parallel and spaced apart relatively far from each other, for example 50 µm. Beams 100 and 102 each have a first moveable end A and C, respectively, which is secured to or integral with a corresponding perpendicular flexible support beam 116, 118. Each support beam 116, 118 has its ends secured to or made integral with the substrate 110 and provides an adjustable mounting to prestress its corresponding beam 100, 102 near the point of buckling. Each beam 100, 102 also has a second fixed end B and D, respectively, which is secured to or made integral with the substrate 110 to provide a fixed mounting and point of reference for the corresponding one of the beams 100, 102. Actuators 120 and 122 are secured to or made integral with corresponding support beams 116 and 118 at beam ends A and C and provide axial compressive forces upon beams 100, 102, respectively, when energized. The actuators 120, 122 may be capacitive comb-drive structures or any desired micro-actuator for supplying axial compressive forces to the beams 100 and 102. For example, other actuator elements such as those which exhibit physical properties responsive to temperature, pressure, humidity, impact, acceleration or any other measurable parameter may be used.

The support beams 116, 118 are not only provided for prestressing of the beams near the point of buckling as previously described, but they also effectively control the direction in which a respective beam 100 or 102 will buckle by introducing asymmetry. As illustrated, the beams 100 and 102 are connected off-center of beams 116 and 118 where connection is made to beam ends A and C, respectively. The exact point of connection along the support beam will influence the direction in which the corresponding beam 100 or 102 will buckle. Thus for example, segments 114 and 115 of beam 116 are unequal and segments 117 and 119 of beam 118 are unequal. Energization of actuators 120 and 122 will therefore cause support beams 116 and 118 to buckle as illustrated in FIG. 11 toward each other. The resultant curvature of support beams 116, 118 will supply a resultant axial compressive force to the corresponding one of beams 100 and 102, causing them to buckle inwardly toward each other so as to ultimately make contact. at a contact point 130.

The beams 100 and 102 are made electrically conductive but in this embodiment they are electrically isolated from each other and from the substrate, such as by providing silicon dioxide segments in the beam ends A and B of beam 100 and beam ends C and D of beam 102. As is known in MEMS devices, electrical leads may be connected to the beams 100 and 102 to enable the beams to serve as electrical contacts of a switch or relay and thereby provide a switching device which is highly sensitive to micromotion. The sensitivity of this structure can be greatly enhanced by the addition of one or more micromotion amplifier stages 26, as described previously with respect to FIG. 2. For example, a micromotion amplifier stage 26 may be used to amplify the axial motion provided by actuator 120 to beam 100. Similarly, amplifier stage 26 may be used to amplify the axial motion provided by actuator 122, of FIGS. 10, 11, to beam 102.

Figure 12:
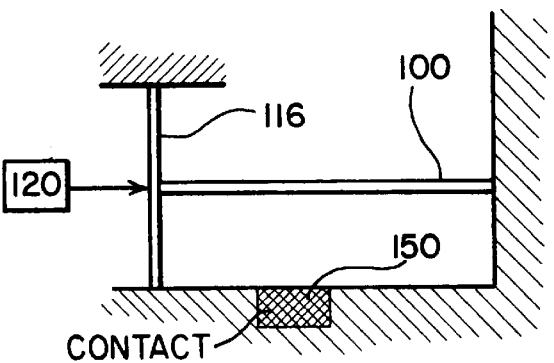
FIG. 12 illustrates in diagrammatic form an alternate embodiment of the micro-switch illustrated in FIG. 10.

In an alternate embodiment illustrated in FIG. 12, a stationary electrical contact 150 may be substituted for the beams 102, 118 and actuator 122 of FIGS. 10, 11. The stationary contact 150 may be fixed to or integral with the substrate 110. The stationary contact 150 may also be fixed to or integral with any other structure in proximity to the buckling of beam 100. Thereby, energization of actuator 120 will buckle conductive beam 100 to a point where contact is made with the stationary electrical contact 150.

Although the invention has been described in terms of preferred embodiments, various modifications will be apparent to those of skill in the art without departing from the true spirit and scope thereof, as set forth in the accompanying claims.

What is claimed is:

1. A micromotion amplifier comprising:
   a first micromechanical beam having a moveable first end, a middle region, a second end connected to a fixed reference and a longitudinal axis;
   an actuator operative upon the first end of said first beam in a direction coincident with the longitudinal axis of said first beam and energizeable for motion with respect to the fixed reference of said first beam; and
   a second micromechanical beam having a moveable first end connected to the middle region of said first beam, a middle region, a second end connected to a fixed reference and a longitudinal axis substantially perpendicular to the longitudinal axis of said first beam,
   wherein energization of said actuator induces a first axial force upon the longitudinal axis of said first beam buckling the middle region of said first beam to a first magnitude and in a direction transverse to the longitudinal axis of said first beam, said buckling of the middle region of said first beam inducing a second axial force upon the longitudinal axis of said second beam buckling the middle region of said second beam to a second magnitude which is greater than said first magnitude and in a direction transverse to the longitudinal axis of said second beam, thereby generating amplified micromotion.

2. A micromotion amplifier according to claim 1, wherein said first beam and said second beam comprise a micromotion amplifier stage.

3. A micromotion amplifier according to claim 1, wherein said first beam and said second beam comprise single crystal silicon.

4. A micromotion amplifier according to claim 1, wherein the fixed reference of said first beam and the fixed reference of said second beam comprise a silicon substrate.

5. A micromotion amplifier according to claim 1 comprising detector means for detecting said buckling of any one of said first and second beams.

6. A micromotion amplifier according to claim 5, wherein said detector means comprises at least one tunneling tip fixed in proximity to the middle region of one of said first and second beams for passing a tunneling current in proportion to said buckling of the one of said first and second beams.

7. A micromotion amplifier according to claim 1, wherein said actuator comprises a capacitive comb-drive actuator.

8. A micromotion amplifier according to claim 1, wherein said actuator comprises a material having a physical property responsive to any one of temperature, pressure or humidity.

9. A micromotion amplifier according to claim 1, wherein said actuator comprises an inertial mass.

10. A micromotion amplifier according to claim 1, wherein the fixed reference of said first beam comprises prestress means for imparting a prestressed axial force upon the longitudinal axis of said first beam.

11. A micromotion amplifier according to claim 10, wherein said prestress means comprises a support beam having a first end connected to a fixed reference, a middle region, a second end connected to a fixed reference and a longitudinal axis, the middle region of said support beam being connected to the second end of said first beam and the longitudinal axis of said support beam being substantially perpendicular to the longitudinal axis of said first beam.

12. A micromotion amplifier according to claim 11, further comprising a second actuator operative upon the middle region of said support beam to axially compress the second end of said first beam.

13. A micromotion amplifier according to claim 1, further comprising a second actuator operative upon the middle region of said first beam for imparting an axially compressive force upon the first end of said second beam coincident with the longitudinal axis of said second beam.

14. A micromotion amplifier according to claim 1, further comprising:
   a third micromechanical beam having a moveable first end connected to the middle region of said second beam, a middle region, a second end connected to a fixed reference and a longitudinal axis substantially perpendicular to the longitudinal axis of said second beam; and
   a fourth micromechanical beam having a moveable first end connected to the middle region of said third beam, a middle region, a second end connected to a fixed reference and a longitudinal axis substantially perpendicular to the longitudinal axis of said third beam,
   wherein said buckling of said second beam induces a third axial force upon the longitudinal axis of said third beam buckling the middle region of said third beam to a third magnitude greater than said second magnitude, said buckling of said third beam induces a fourth axial force upon the longitudinal axis of said fourth beam buckling the middle region of said fourth beam to a fourth magnitude greater than said third magnitude, and thereby generating amplified micromotion in response to energization of said actuator.

15. A micromotion amplifier according to claim 14, further comprising a second actuator operative upon the middle region of said first beam to axially compress the first end of said second beam, a third actuator operative upon the middle region of said second beam to axially compress the first end of said third beam and a fourth actuator operative upon the middle region of said third beam to axially compress the first end of said fourth beam.

* * * * *